3,028,344
FOAMED EPOXY RESINS AND PROCESS OF
PREPARING SAME
Robert L. Johnson, Park Falls, Wis.
(302 Breeze Terrace, Madison, Wis.)
No Drawing. Filed Apr. 21, 1959, Ser. No. 807,773
9 Claims. (Cl. 260—2.5)

This invention relates to new compositions of matter and to processes for the production thereof. More particularly, this invention pertains to improved epoxy-foamed resins.

Heretofore, in order to prepare a satisfactory epoxy foam, it has been necessary to incorporate into the foam recipe expensive foaming agents such as Celogen (p,p'-oxybis-(benzene sufonyl hydrazide)) and certain azo compounds. High temperatures achieved through external application of heat have also been required in order to initiate the foaming process. The prior art epoxy foam recipes have in addition required lengthy curing cycles to produce a satisfactory product.

There is a substantial need for foams which can be expanded at room temperature, i.e., from about 20 to about 30° C., without the application of external heat required by prior art foams. These foams are especially useful for insulating large equipment or irregular or complicated shapes. Such equipment cannot be conveniently heated, thus, the foams cannot be expanded in place by heating. Also, since the shapes are irregular and complicated, it is not convenient and is oftentimes impossible to insulate the equipment with previously expanded foams. One solution to the problem lies in expanding the foam in place at room temperature without any external application of heat.

It is therefore an object of this invention to provide a flexible process for the manufacture of an epoxy foam which requires no pre-heating to initiate foaming. Another object is to provide a more readily cured economical epoxy foam resin. It is also an object to provide an epoxy foam recipe which utilizes low-cost foaming agents.

The above and other objects of this invention are accomplished by providing a composition suitable for producing a foamed epoxy resin comprising an epoxy resin and an α-metallo-metallic salt of a carboxylic acid. Epoxy foaming recipes containing an α-metallo-metallic salt of a carboxylic acid are an improvement over the prior art in that such recipes do not require externally applied heat to initiate the foaming process. These compositions also have an improved viscosity and require decreased gellation time which provide better control of the foaming process. The result of this is an improved foamed product. Furthermore, the employment of the α-metallo-metallic salt makes possible the use of low-cost foaming agents as opposed to the expensive foaming agents utilized in prior art recipes. Examples of these low-cost foaming agents are the solvent foaming agents of this invention. These materials are defined more fully hereinafter; however, at this point it is to be understood that the term "foaming agent" as used herein includes these solvent foaming agents.

Also encompassed by this invention is a composition of matter suitable for producing foamed epoxy resins comprising an epoxy resin, a curing agent for said epoxy resin, an α-metallo-metallic salt of a carboxylic acid, and a foaming agent for said resin. In one embodiment the aforementioned foaming agent is an inert solvent having a boiling point between about 100 and 200° C. Another composition within the scope of this invention comprises an epoxy resin produced by the reaction of epichlorohydrin and bis-phenol-A in the presence of aqueous caustic, a curing agent comprising diethylene triamine, and α-sodio-sodium acetate.

The above compositions can be produced by the incorporation of an α-metallo-metallic salt of an organic acid into an epoxy foam recipe. In general, the process is effected simply by adding the α-metallo-metallic salt of a carboxylic acid to a standard epoxy foam recipe comprising an epoxy resin, a curing agent, and a foaming agent. The foaming process is carried out in a mold or any other suitable restraining container.

The following working examples are illustrative of this invention. In these working examples, the process employed involved mixing the epoxy resin, the curing agents, and the foaming agent in a mold and thereafter adding the α-metallo-metallic salt of a carboxylic acid. Upon addition of the carboxylic acid salt, the reaction mixture was again mixed well and thereafter spontaneous foaming occurred. In Examples I through III the epoxy resin employed is the reaction product between bis-phenol-A and epichlorohydrin in the presence of aqueous caustic. The melamine formaldehyde employed is a standard melamine formaldehyde resin. In all working examples following, parts are by weight.

*Example I*

| Compound used: | Parts used |
|---|---|
| Epoxy resin | 100 |
| α-sodio-sodium acetate | 15 |
| Melamine formaldehyde | 25 |
| Diethylene triamine | 15 |
| Toluene | 10 |

Results: Good foam and cell size. Not $H_2O$ sensitive.

*Example II*

| Compound use: | |
|---|---|
| Epoxy resin | 100 |
| α-sodio-sodium acetate | 15 |
| Melamine formaldehyde | 25 |
| Diethylene triamine | 30 |
| Xylene | 30 |

Results: Good foam, slightly flexible.

*Example III*

| Compound use: | |
|---|---|
| Epoxy resin | 100 |
| α-sodio-sodium acetate | 15 |
| Melamine formaldehyde | 25 |
| Diethylene triamine | 30 |
| Dimethyl carbitol | 30 |

Results: Good foam, slightly flexible.

Important to note is that when the foaming recipes of the above examples were compounded without the α-sodio-sodium acetate ingredient, pre-heating to a temperature of about 100–110° C. was required to initiate foaming. Furthermore, a foamed product was not obtained since the foam collapsed due to the poor viscosity and slow gellation of the foaming composition.

The resins employed in this invention are epoxy resins: generally those produced by the reaction of epichlorohydrin and a polyhydroxy hydrocarbon. These resins are usually made by the condensation of epichlorohydrin with bis-phenol-A, ethylene glycol, glycerol, and related hydroxyl containing compounds; bis-phenol-A

is generally employed. Other dihydric phenols such as resorcinol, and hydroquinone may also be used. Another type of resin employs a polyhydric alcohol like glycerol in place of the dihydric phenol. In one embodiment epoxy resins having an epoxide equivalent (grams of resin containing one equivalent of epoxide) ranging from 450–3000 are used.

The polyhydroxy hydrocarbons which can be employed in a reaction with epichlorohydrin to make the epoxy resins utilized in this invention are more fully illustrated by the following general formula:

$$R(OH)_x$$

wherein R equals a hydrocarbon radical containing between about 2 to 30 carbon atoms, preferably a hydrocarbon derived from an arene molecule containing between about 6 through 15 carbon atoms. R can also be a hydrocarbon derived from an alkane containing between about 2 through 6 carbon atoms. X is an integer greater than 1 representing the number of hydroxy groups substituted on the hydrocarbon R. Further illustrative of the specific polyhydroxy compounds which can be employed herein are 2,2'-bis(hydroxyphenyl) propane, 2,2'-bis-(hydroxyphenyl) butane, 3,3'-bis-(hydroxyphenyl) pentane, 2,2'-bis-(2-methyl-4-hydroxyphenyl) propane, ethylene glycol, propylene glycol, butylene glycol-2,3, butylene glycol-1,3, 2-methyl pentane diol-2,4, 2-ethyl hexane diol-1,3, hexamethylene glycol, styrene glycol, and decamethylene glycol, etc., and diethylene glycol, triethylene glycol, tetraethylene glycol, polyethylene glycols 200, 400, and 600, etc., dipropylene glycol, tripropylene glycol, polypropylene glycols 400, 750, 1200 and 2000, etc.

Broadly, any of the prior art epoxy resins similar to those described above can be employed in the instant invention. These prior art epoxy compounds are more fully defined in "High Polymers," volume 10, Schildknecht: generally, in Chapter 10 and specifically at pages 430 to 439.

Those curing agents which can be employed in the instant invention are any standard resin curing agent such as those described by Schildknecht, "High Polymer Processes," vol. 10, Chap. 10. Examples of these curing agents are: organic amines such as ethylene diamine, diethylene triamine, dimethylaminopropylamine, 2,4-diamino-2-methylpentane, dimethylaminomethyl phenol, 2,4,6-tris-(dimethylaminomethyl)phenol, morpholine and benzyl dimethylamine (pages 439–454). Acid anhydrides such as phthalic, succinic, and maleic anhydrides, along with other acids such as n-butyl dihydrogen phosphate and phosphoric acid. Polysulfide liquid polymers of the thiokol-type are also used. Aldehyde condensation resins such as urea-formaldehyde, melamine-formaldehyde and phenol-formaldehyde act as curing agents. Amides such as acrylamide, urea, thiourea, toluene sulfonamide, t-butyl acrylamide are also used. Boron trifluoride complexes with amines such as dimethylamine, ethylamine and piperidine cure epoxides rapidly at high temperatures. These curing agents can be used alone or formulated into a standard curing recipe. The foaming agents employed herein can be any standard epoxy resin blowing agent, now being used or heretofore used in the prior art.

Generally, any prior art foaming agents for producing foamed epoxy resins are applicable in the instant invention.

In the prior art, two groups of foaming agents are generally used in the preparation of cellular materials—inorganic foaming agents and organic substances decomposed by heat to liberate gases. To the latter belong mixtures of urea and biuret, the phenylhydrazines, diazoamino benzene, azo dinitriles, dinitrosopentamethylene tetramine, the salts of bis-(imino amino methyl) disulfide, and pent-aza-diene. Other illustrative prior art blowing agents are sodium bicarbonate, 2,5-dimethyl-2,5-dicyano-3,4-diazohexane, diazoamino benzene, azodiisobutyronitrile, and other selected nitrogen compounds as for example di-N-nitroso pentamethylene tetramine, di-N-nitrosopentamethylene diamine, etc. Furthermore, N-nitroso β-amino ketones such as N-isopropyl N-nitroso diacetone amine, and N-methyl N-nitroso diacetoneamine, etc., can be employed. Also, selected bis-nitroso compounds can be utilized such as the diamino-N,N'-dinitroso-N,N'-di(α,α-dialkyl-gamma-ketoalkyl) alkanes, etc. In addition to these foaming agents it is preferred to employ as a foaming agent in this invention an inert solvent having a boiling point between about 100 and 200° C. by inert is meant inert to the α-metallo-metallic salt of a carboxylic acid used in this invention. Representative of these inert solvents are aromatic hydrocarbons such as toluene, xylene, ethyl benzene, etc.; aliphatic cyclic amines such as morpholine, cyclohexylamine, methyl piperidine, etc.; ethers like dimethoxy ethane, dimethyl ether of diethylene glycol, methylphenyl ether, etc.; esters such as butyl acetate, ethyl propionate, etc. Dipropylamine and pyridine can also be used.

The following non-limiting illustrative examples more fully describe typical compositions of the instant invention.

In Examples IV and V the epoxy resin employed is produced by the reaction between epichlorohydrin and ethylene glycol. (The process utilized is that employed in Example I.)

*Example IV*

Compound used:                                  Parts used
  Epoxy resin ------------------------------------ 100
  Morpholine ------------------------------------- 10
  Sodium bicarbonate ----------------------------- 30
  α-Sodio-sodium propionate ---------------------- 10

*Example V*

Compound used:
  Epoxy resin ------------------------------------ 100
  Maleic anhydride ------------------------------- 30
  Diazoamino benzene ----------------------------- 10
  α-Lithio-lithium isobutyrate ------------------- 30

In Examples VI and VII the epoxy resin employed is the reaction produced when epichlorohydrin is reacted with resorcinol. The process employed is thorough premixing of the epoxy recipe followed by the addition thereto of the carboxylic acid salt. This mixture is then further mixed and quickly poured into a mold to foam.

*Example VI*

Compound used:
  Epoxy resin ------------------------------------ 100
  Acrylamide ------------------------------------- 15
  Ethyl propionate ------------------------------- 15
  Potassium salt of 2-sodio-3-butenoic acid ------ 25

*Example VII*

Compound used:
  Epoxy resin ------------------------------------ 100
  $BF_3$: piperidine ----------------------------- 10
  Di-N-nitrosopentamethylene diamine ------------- 12
  α-Sodio-sodium acetate ------------------------- 18

In Examples IV through VII a satisfactory foamed product is thereby produced. Similar foamed products are produced by varying the ingredients which constitute the recipes of this invention. Thus by the substitution of the components in the basic recipe of Example I with other epoxy resins, curing agents, foaming agents and α-metallo-metallic salts of carboxylic acids in similar proportions, a foamed product is produced. These materials have been described above. It therefore is not intended that the subject invention be limited to the scope of disclosure in the above examples but rather to a scope commensurate with the fact that any of the herein described materials are applicable in this invention in producing the desired product.

It is generally desirable to employ the α-metallo-metallic salt of a carboxylic acid in amounts varying between about 10–30 percent by weight of the epoxy resin employed. Greater amounts of the metallic salt increase the rate of reaction and the heat thereof; lowering the amounts outside of this range tends to decrease the rate of reaction and decrease the heat evolved.

Similarly, it is desirable to employ a curing agent in the amount between about 10–30 percent by weight of the epoxy employed. An increase beyond this range tends to increase the rate of the exothermic reaction making the foaming process run faster and hotter. Correspondingly, a decrease below the range set forth decreases the rate of reaction and the heat evolved. In some cases it is possible to utilize lesser amounts of the curing agent without any detrimental effects on the product by utilizing increased amounts of the α-metallo-metallic salt of this invention. Because of this it is thought that these metallic salts also act as curing agents.

In most cases about 10–30 percent by weight of the epoxy resin employed corresponds to the amount of foaming agent which should be utilized. When an inert solvent having a boiling point between about 100–200° C. is used in amounts more than 30 percent by weight of the epoxy resin employed, the toughness and strength of the epoxy foam produced is decreased.

The exothermic temperature of the foaming reaction is controlled by the percentages of the ingredients employed in the foaming recipe. It is preferred to run the reaction below about 270° C. No pre-heating is necessary to initiate the exothermic reactions.

If desired, various other ingredients can be added to the foam recipes of the instant invention. These include conventional plasticizers, stabilizing agents, lubricants, fillers, pigments, and the like.

The α-metallo-metallic salt of carboxylic acids employed in this invention can be depicted by the formula

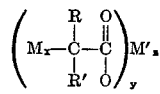

wherein R and R' can be the same or different and are selected from the group consisting of hydrogen and organic radicals; M and M' are monovalent or polyvalent metallic ions which can be the same or different; and $x$, $y$ and $z$ can be the same or different and are small whole numbers.

Those α-metallo-metallic salts which are especially preferred in this invention are the alkali and alkaline earth metal salts of an α-metallo-metallic acetate. These compositions are produced according to the methods described in U.S. 2,850,528.

The following list of compounds more fully describes the α-metallo-metallic salts of this invention: α-sodio-sodium propionate, α-sodio potassium-4-methyl caproate, α-potassio sodium vinyl acetate, α-sodio-sodium-2-cyclohexyl acetate, α-lithio-lithium isobutyrate, α-sodio calcium acetate and α-potassio aluminum acetate. These compounds can be employed in the foregoing examples in place of the α-sodio-sodium acetate and related compounds employed therein to produce foamed epoxy resin products.

Those metal salts especially preferred are the alkali and alkaline metal salts of an α-metallo-metallic acetate. These compositions are produced according to the methods described in U.S. 2,850,528.

The foams of this invention are useful in any application where a light-weight, tough, heat-resistant material is needed. Such applications are thermal insulation for pumps, motors, pipes, fire walls, for light-weight reinforcing material, in structural members. Also these materials are useful as potting resins or as floatation materials.

I claim:

1. A foamed epoxy resin obtained by reacting (1) an epoxy resin derived from epichlorohydrin and a polyhydroxy hydrocarbon, (2) a curing agent for said epoxy resin, and (3) an α-metallo-metallic salt of a carboxylic acid wherein said metallo and metallic constituents are selected from the group consisting of alkali and alkaline earth metals in admixture with (4) a foaming agent suitable for producing foamed epoxy resins, said foaming agent being unreactive with said resin, said curing agent and said salt.

2. The foamed epoxy resin of claim 1 wherein said foaming agent is an inert solvent having a boiling point between about 100° and 200° C.

3. The foamed epoxy resin of claim 1 wherein said epoxy resin reactant has an epoxide equivalent ranging from about 450 to about 3000, said curing agent is diethylene triamine and said salt is α-sodio-sodium acetate.

4. A foamed epoxy resin obtained by reacting a glycidyl polyether of 2,2-di-(p-hydroxyphenyl) propane, melamine formaldehyde, diethylene triamine, and α-sodio-sodium acetate in admixture with toluene.

5. A process for the preparation of an improved foamed epoxy resin which comprises admixing (1) an epoxy resin derived from epichlorohydrin and a polyhydroxy hydrocarbon, (2) a curing agent for said epoxy resin, (3) an α-metallo-metallic salt of a carboxylic acid, and (4) a foaming agent suitable for producing a foamed epoxy resin; said foaming agent being unreactive with said resin, said curing agent and said salt; the metallo and metallic constituents of said salt being selected from the group consisting of alkali and alkaline earth metals.

6. The process of claim 5 wherein said foaming agent is an inert solvent having a boiling point between about 100° and 200° C.

7. The process of claim 5 wherein said epoxy resin reactant has an epoxide equivalent ranging from about 450 to about 3000, said salt is α-sodio-sodium acetate, and said foaming agent is an inert solvent having a boiling point between about 100° and 200° C.

8. The process of claim 5 wherein said epoxy resin reactant has an epoxide equivalent ranging from about 450 to about 3000, said curing agent is diethylene triamine, said salt is α-sodio-sodium acetate, and said foaming agent is an inert solvent having a boiling point between about 100° and 200° C.

9. A process for producing an improved foamed epoxy resin which comprises admixing a glycidyl polyether of 2,2-di-(p-hydroxyphenyl) propane, diethylene triamine, melamine formaldehyde, and α-sodio-sodium acetate in admixture with toluene.

References Cited in the file of this patent

UNITED STATES PATENTS

| 2,444,333 | Castan | June 29, 1948 |
| 2,591,539 | Greenlee | Apr. 1, 1952 |
| 2,739,134 | Parry et al. | Mar. 30, 1956 |
| 2,850,528 | Closson | Sept. 2, 1958 |

OTHER REFERENCES

Noller: "Chemistry of Organic Compounds," 2nd edition, W. B. Saunders Company, Philadelphia, 1957, page 148 relied on.